United States Patent

[19] Martin

[11] Patent Number: 6,062,582
[45] Date of Patent: *May 16, 2000

[54] LAWN MOWER RIDING SULKY

[76] Inventor: John W. Martin, 4415 Wendy Hills Dr., Crestwood, Ky. 40014

[*] Notice: This patent is subject to a terminal disclaimer.

[21] Appl. No.: 09/337,963

[22] Filed: Jun. 22, 1999

Related U.S. Application Data

[63] Continuation-in-part of application No. 08/916,492, Aug. 22, 1997, Pat. No. 5,947,505.

[51] Int. Cl.[7] ................................................ B62D 63/00
[52] U.S. Cl. .......................................... 280/493; 280/32.7
[58] Field of Search .................................. 280/32.7, 493, 280/494; 172/677, 631, 450, 433

[56] References Cited

U.S. PATENT DOCUMENTS

| | | |
|---|---|---|
| 224,390 | 2/1880 | Cole . |
| 1,385,535 | 7/1921 | Frisby . |
| 2,354,576 | 7/1944 | Clark . |
| 2,563,372 | 8/1951 | Risse . |
| 2,729,196 | 1/1956 | Breitenbach . |
| 2,919,756 | 1/1960 | Knipe . |
| 2,955,835 | 10/1960 | Chouinard . |
| 3,223,179 | 12/1965 | MacKenzie ............................. 280/204 |
| 4,588,199 | 5/1986 | Fisher ..................................... 280/204 |
| 4,828,282 | 5/1989 | Pinto . |
| 5,004,251 | 4/1991 | Velke et al. ........................... 280/32.7 |
| 5,118,123 | 6/1992 | Betrock . |
| 5,257,885 | 11/1993 | Reil . |
| 5,388,850 | 2/1995 | Simone . |
| 5,413,364 | 5/1995 | Hafendorfer . |
| 5,785,453 | 7/1998 | Marty et al. .............................. 404/94 |
| 5,810,371 | 9/1998 | Velke ..................................... 280/32.7 |
| 5,813,679 | 9/1998 | Hobrath . |
| 5,947,505 | 9/1999 | Martin ..................................... 280/493 |

OTHER PUBLICATIONS

Velke Promotional Flier, Wright Manufacturing, Inc. Gaithersburg, MD.

Turf Rider Promotional Flier, Turf Rider, Inc. Minnetonka, MN.

Byers Gold Promotional Flier, Byers Gold Louisville, KY.

Jungle Wheels Promotional Flier, Jungle Jim's Accessory Products, Inc.–Louisville, KY.

*Primary Examiner*—Kevin Hurley
*Assistant Examiner*—Andrew J. Fischer
*Attorney, Agent, or Firm*—Stites & Harbison, PLLC; David W. Nagle, Jr.; Vance A. Smith

[57] ABSTRACT

A riding attachment is adapted to be connected to a self-propelled lawn mower for carrying a standing rider/operator behind the mower during operation of the mower. This riding attachment includes a mounting assembly, a tow bar assembly, a pivot assembly, and a riding assembly. One end of the tow bar assembly is pivotably connected to the mounting assembly to allow for rotation of the tow bar assembly about a first axis parallel to a plane of the mower and transverse to the direction of movement of the mower. The riding assembly, including a platform for supporting the standing operator, is pivotally connected to the pivot assembly which, in turn, is connected to the tow bar assembly. This pivot assembly allows for pivoting of the riding assembly about an axis essentially parallel to the mower plane and to the direction of movement of the mower. The riding attachment further includes a pivot limiting element associated with the pivot assembly that limits the pivoting of the riding assembly out of the plane of the mower to a predetermined limit angle. This riding attachment thus safely carries the operator behind the mower over uneven terrain, preventing dislodgment of the operator or overturning of the riding assembly on which the operator stands. Moreover, the attachment of the pivot assembly to the tow bar by a substantially vertical pin facilitates turning of the mower.

19 Claims, 3 Drawing Sheets

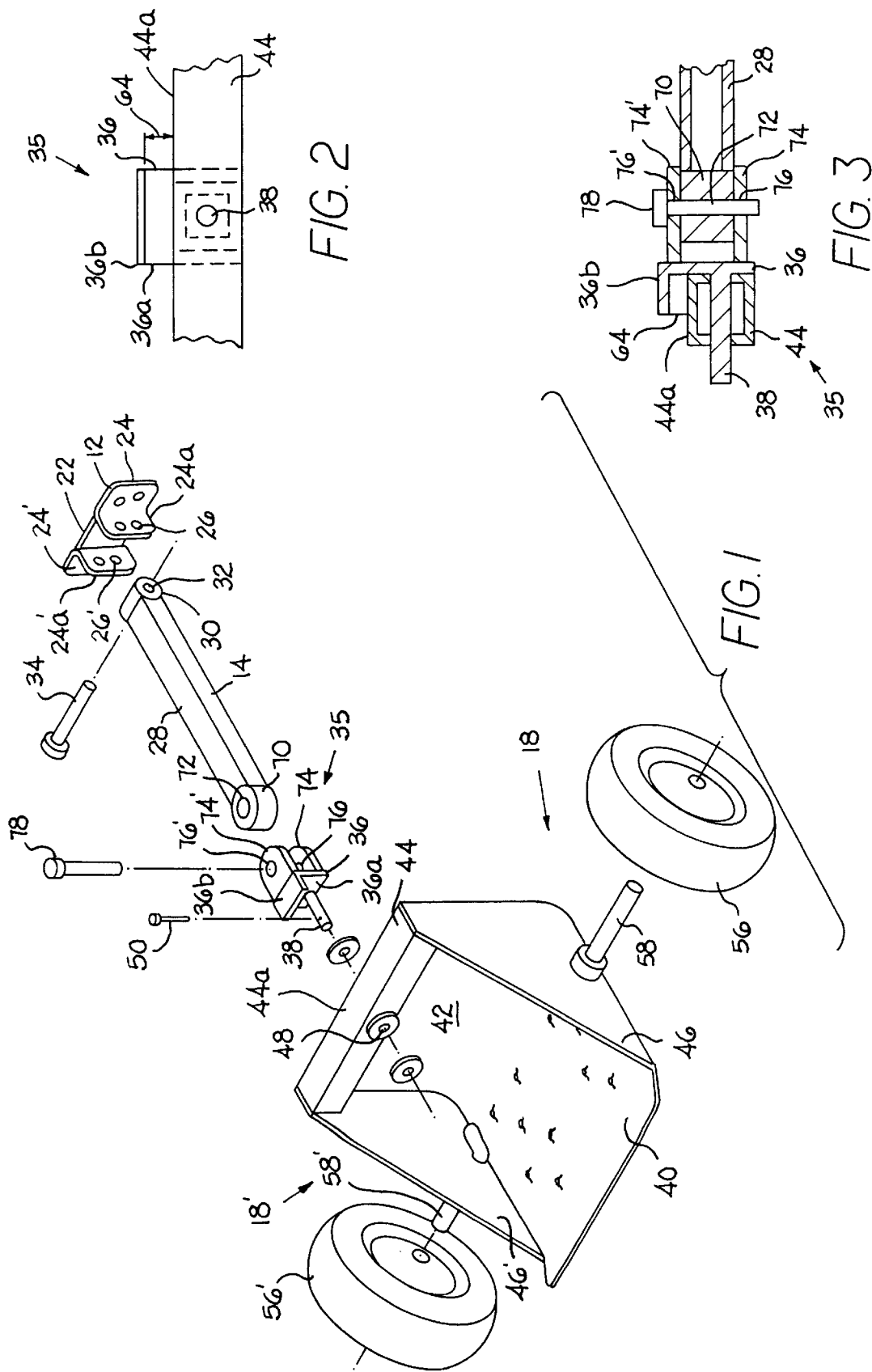

LAWN MOWER RIDING SULKY

This application is a continuation-in-part of commonly assigned and U.S. application Ser. No. 08/916,492, filed Aug. 22, 1997, which issued as U.S. Pat. No. 5,947,505 on Sep. 7, 1999.

BACKGROUND OF THE INVENTION

The invention described herein pertains to a sulky for a self-propelled lawn mower for carrying an operator in a standing position safely behind the mower, thus eliminating the need for the operator to walk behind the mower.

Devices for attachment to self-propelled power lawn mowers, allowing a standing operator to be carried with the mower, have been in use for many years. An early example may be seen in U.S. Pat. No. 2,955,835 issued Oct. 11, 1960 to Chouinard. The apparatus, typically called a "sulky," consists of a platform mounted between two wheels that is connected to the mower by a tow bar. Chouinard's tow bar is connected to the mower by a universal joint allowing the sulky to move in all directions relative to the mower during operation. Another sulky apparatus is illustrated in U.S. Pat. No. 5,004,1991 to Velke; it employs a platform covering a single wheel located between the foot plates for the operator's feet. The platform is pivotally connected to one end of the tow bar along a vertical axis, allowing free rotation of the platform horizontally. The other end of the tow bar is pivotally connected to the mower along a horizontal axis to allow the platform and tow bar to move up and down with respect to the mower. Still another sulky apparatus is described in U.S. Pat. No. 5,413,364 issued May 9, 1995 to Hafendorfer; this sulky provides another pivoting action as it permits the sulky to pivot about an axis that is aligned with the length of the tow bar. Pivoting of the sulky about this axis permits the sulky to accommodate uneven ground.

None of the sulky apparatus typified by the above references, however, addresses the problem of too much pivoting of the sulky away from the plane of the mower, pivoting that could result in the dislodgment of the operator or overturn of the entire sulky.

The aforementioned co-pending and commonly assigned U.S. patent Ser. No. 08/916,492 describes a riding attachment that does address this concern. More specifically, the application describes a riding attachment adapted to be connected to a self-propelled lawn mower for carrying a standing rider/operator and comprising a tow bar assembly, a riding assembly, and a pivot limiting element that limits the pivoting of the riding assembly out of the plane of the mower to a predetermined limit angle. The tow bar assembly is pivotally connected to the mower for pivoting about a first axis essentially parallel to the mower plane and essentially transverse to the direction of movement of the mower during operation. The tow bar assembly is constrained against pivoting with respect to the mower about an axis essentially vertical. The riding assembly, including a platform for supporting the standing operator, is pivotally connected to the tow bar assembly for pivoting about a second axis essentially parallel to the mower plane and to the direction of movement of the mower. The riding assembly is also constrained against pivoting about an axis essentially vertical with respect to the tow bar assembly. The pivot limiting element is associated with the tow bar assembly and limits the pivoting of the riding assembly about the second axis so that the riding assembly is prevented from turning over when severe uneven terrain is encountered.

However, the invention described in the co-pending application has some attendant disadvantages. Most importantly, since the riding assembly is constrained against pivoting about an axis essentially vertical with respect to the tow bar assembly, operators of gear drive motors may encounter some difficulty in turning with the mower. This problem arises because when the riding assembly is constrained from pivoting relative to the tow bar assembly, the mower must carry the weight of the operator through the turn. Thus, in mowers employing gear drives, as opposed to hydrostatic drives, the belts which grip the wheel axles may slip when the operator attempts a sharp turn due to weight of the operator, making sharps turns difficult, if not impossible, to perform.

It is therefore a paramount object of the present invention to provide for a sulky apparatus that has a riding assembly that is connected to a tow bar assembly such that the riding assembly can pivot relative to the mower plane but will not overturn, and such that the operator can easily turn the mower.

Other important objects will become clear to those skilled in the art upon a reading of the description accompanied by the appended drawings.

SUMMARY OF THE INVENTION

The present invention pertains to a riding attachment adapted to be connected to a self-propelled lawn mower for carrying a standing rider/operator and comprising a tow bar assembly, a pivot assembly, a riding assembly, and a pivot limiting element associated with the pivot assembly that limits the pivoting of the riding assembly out of the plane of the mower to a predetermined limit angle. The tow bar assembly is pivotally connected to the mower for pivoting about an axis essentially parallel to the mower plane and essentially transverse to the direction of movement of the mower during operation. The tow bar assembly is constrained against pivoting with respect to the mower about an axis essentially vertical. The riding assembly, including a platform for supporting the standing operator, is pivotally connected to the pivot assembly which, in turn, is connected to the tow bar assembly. This pivot assembly allows for pivoting of the riding assembly about an axis essentially parallel to the mower plane and to the direction of movement of the mower. A pivot limiting element is associated with the pivot assembly and limits the pivoting of the riding assembly about this axis so that the riding assembly is prevented from turning over when severe uneven terrain is encountered. Additionally, the pivot assembly is secured to the tow bar by a pin that allows for pivoting of the riding assembly relative to the tow bar about a substantially vertical axis, thus facilitating turning of the mower.

BRIEF DESCRIPTION OF THE DRAWINGS

FIG. 1 is an exploded perspective view of the riding attachment of the present invention, showing each of the individual components of a preferred embodiment;

FIG. 2 is an end view of the pivot assembly and a portion of the support bar of the platform assembly;

FIG. 3 is a sectional view taken along lines 3—3 of FIG. 1;

DETAILED DESCRIPTION OF THE PREFERRED EMBODIMENT

A preferred attachment made in accordance with the present invention is generally comprised of a mounting bracket assembly, a tow bar assembly, a pivot assembly, and a rolling operator platform assembly, or riding assembly. This attachment permits limited rotation about the horizontal axis created by the tow bar; however, the rotation is limited physically by a pivot limiting element associated with the pivot assembly to prevent the platform from turning over or throwing the operator from the platform. Additionally, the pivot assembly permits the riding assembly to pivot relative to the tow bar about a substantially vertical axis.

Figure 4:
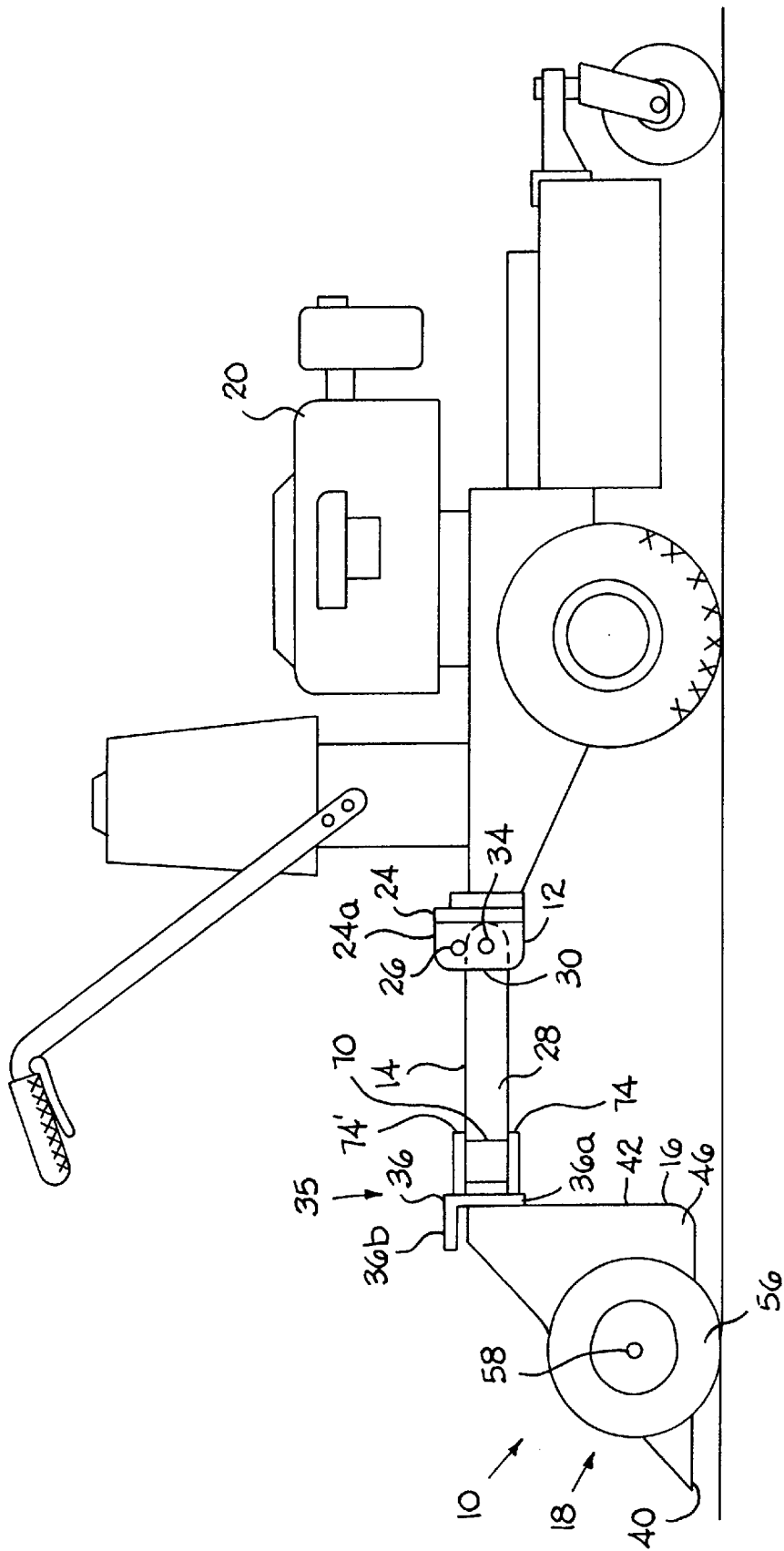
FIG. 4 is a side view of a typical lawnmower coupled to the riding attachment of the present invention.
Figure 5:
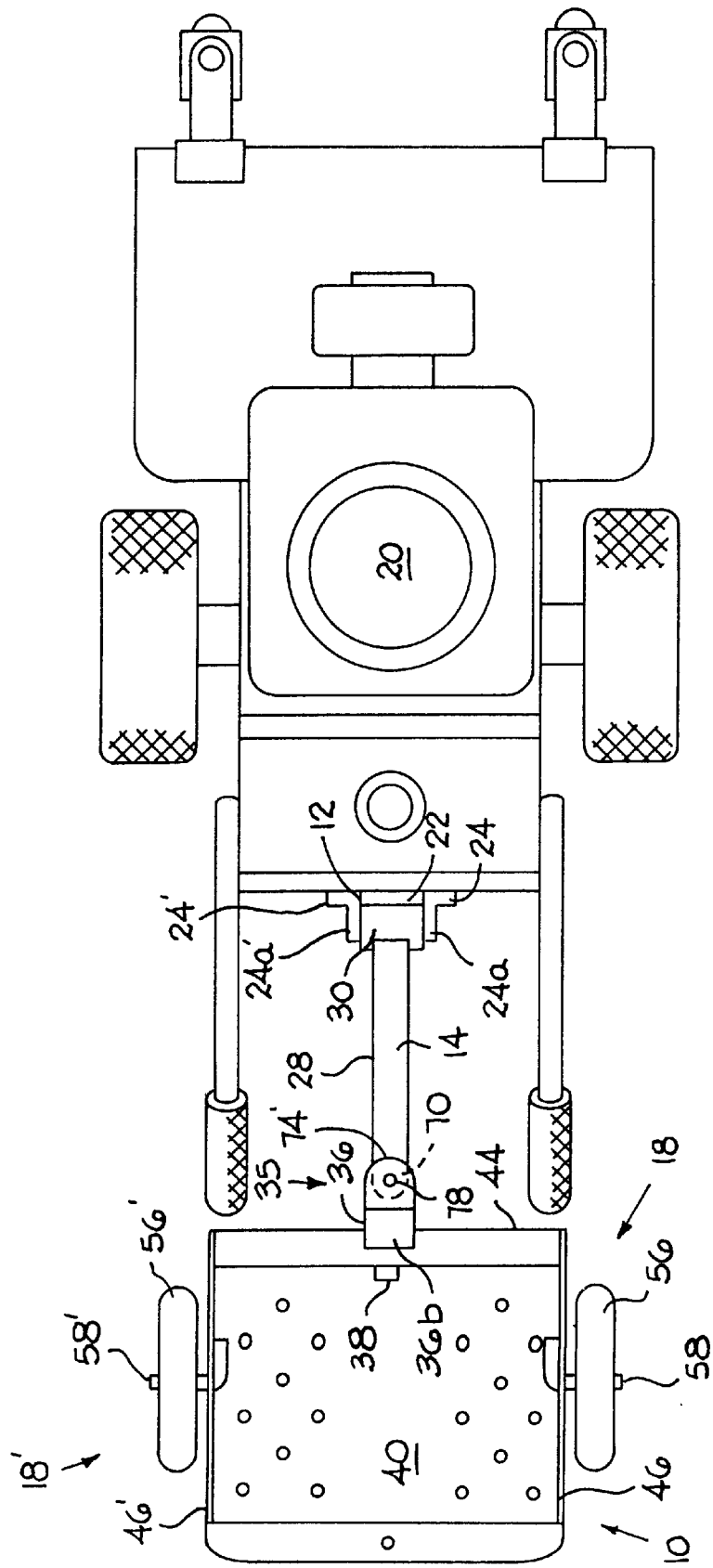
FIG. 5 is a top view of the lawnmower and riding attachment shown in FIG. 4.

Referring to the Figures, and particularly FIG. 1 and the side view of FIG. 4, it may be seen that the operator-carrying sulky of the present invention, shown generally by character numeral 10, comprises a mounting bracket assembly 12, a tow bar assembly 14, a pivot assembly 35, a riding assembly 16, and a pair of wheel assemblies 18,18'. The various assemblies are easily connected and disconnected for use and maintenance. The mounting bracket assembly 12 serves as a connection between the lawn mower 20 and the tow bar assembly 14. In the preferred embodiment, the mounting bracket assembly 12 is generally comprised of a rectangular steel plate 22 to which two L-shaped steel brackets 24, 24' are welded. The mounting bracket assembly 12 is welded or otherwise attached to the lawn mower 20 with the rectangular plate 22 oriented in a plane perpendicular to the ground. In this orientation, the legs 24*a*, 24*a*' of each L-shaped bracket 24 point away from the mower 20 toward the rear. A plurality of holes 26, 26' are drilled in each of the legs 24*a*, 24*a*' of the L-shaped brackets 24, 24'.

The tow bar assembly 14 provides the connecting link between the mounting bracket assembly 12 and the riding assembly 16. In the preferred embodiment, the tow bar assembly 14 comprises, in part, a tow bar 28 in the form of a length of square steel tubing that terminates at one end in a cylindrically shaped boss 30 defining a bore 32. The boss 30 has a length slightly greater than the outer diameter of the tow bar 28. The boss 30 may be fitted as desired with bushing material (not shown) and, when the bore 32 is properly in registry with a selected pair of the holes 26, 26' of the mounting bracket assembly 12, receives a lynch or locking pin 34 to pivotally lock the tow bar assembly 14 to the bracket assembly 12.

The second end of the tow bar 28 is integrally connected to a pivot assembly 35, which includes a pivot limiting element 36, which is generally an L-shaped flange plate, and a pivot pin 38. As shown in the Figures, the second end of the tow bar 28 terminates at a second cylindrically shaped boss 70 defining a bore 72. The pivot assembly 35 further includes two spaced brackets 74, 74' each oriented in a plane parallel to the ground and pointing toward the mower 20. Each of the brackets 74, 74' define an opening 76, 76' through the respective bracket 74, 74'. When the bore 72 defined at the second end of the tow bar 28 is properly in registry with the openings 76, 76' of the brackets 74, 74', a pivot pin 78 is received through the openings 76, 76' and the bore 72, thereby pivotally connecting the tow bar 28 to the pivot assembly 35.

The pivot limiting element 36 itself comprises a first leg 36*a* that is secured to the brackets 74, 74' (and thus pivotally secured to the tow bar 28) and a second leg 36*b* extending over and spaced a predetermined distance from the top surface 44*a* of the support bar 44 of the riding assembly 16, as will be further described. The pivot pin 38, welded or otherwise secured to pivot limiting element 36, is positioned to extend out from the pivot limiting element 36 along an extension of the centerline of tow bar 28.

The riding assembly 16 essentially must facilitate rapid attachment to and detachment from the tow bar assembly 14, allow for similar attachment and detachment of the wheel assemblies 18, 18', and be sufficiently sturdy to carry the weight of the operator. In the preferred embodiment, the riding assembly 16 includes an L-shaped main carriage defining an essentially horizontal platform 40 and a vertical front wall 42. The platform 40 is made of a sturdy material such as plate steel capable of supporting a standing operator and may be supplied with treads or an anti-slip material on the top surface thereof. The front wall 42 is welded or otherwise attached to the underneath surface of a support bar 44 made of steel or similarly sturdy material. Providing further structural integrity to the riding assembly 16 are two essentially right angle trapezoidal gussets 46, 46' welded to the sides of the platform 40 and front wall 42. The front wall 42 and the gussets 46, 46' also protect the lower part of the operator's legs from extraneous material that might be dislodged during mowing operation and thrown toward the operator.

The center of the support bar 44 defines a bore 48 which receives the pivot pin 38 of the pivot assembly 35. This pivot pin 38 is locked into position by a lynchpin 50. Bushing material (not shown) may be used to line the bore 48 as desired to facilitate pivoting of the riding assembly 16 about the pivot pin 38. Finally, two wheel assemblies 18,18', each comprised of a tire 56, 56' and an axle 58, 58', are appropriately mounted to the side gussets 46, 46' of the riding assembly 16.

The connections between the mounting bracket assembly 10, the tow bar assembly 12, the pivot assembly 35, and the riding assembly 16, and the relationship and positioning of the various axes of rotation are the important features of the present invention. When the holes 26, 26' of the mounting bracket assembly 12 and the bore 32 of the boss 30 are in registry, the connecting pin 34 is positioned parallel to the "plane of the mower." The plane of the mower may be best defined as the plane determined by the contact points of the wheels of the mower 20 with the underlying terrain surface. If the terrain surface is horizontal, then the mower plane and thus the axis of rotation of the tow bar assembly 14 about the connecting pin 34 would be horizontal. If the terrain is uneven, then the mower plane and the tow bar axis of rotation would be tilted with respect to the horizontal reference plane. Additionally, the axis of rotation of the tow bar assembly 14 is essentially transverse to the movement of the mower 20. Rotation of the tow bar assembly 12 relative to the mower 20 about a vertical axis, however, is not permitted. The riding assembly 16, through the connection of the support bar 44 to the pivot pin 38 of the pivot assembly 35, is permitted to have limited rotation with respect to the tow bar assembly 14 about an axis essentially parallel to the mower plane and aligned parallel to the movement of the mower 20. The predetermined distance or gap 64 between the leg 36*b* and the top surface 44*a* of the support bar 44 allows for rotation until the top surface 44*a* of said support bar 44 abuts the leg 36*b* of the pivot limiting element 36. Preferably, the gap 64 limits rotation relative to the tow bar 28 to an angle no more than about 20° from a rest position or zero angle position where the top surface 44*a* of the support bar 44 is parallel with the flange leg 36*b*. This maximum angle is called the predetermined maximum displacement angle. By limiting the displacement angle to this maximum, the risk of dislodging the operator from being dislodged or overturning of the riding assembly when severely uneven terrain is encountered is minimized.

Furthermore, the above described pivot assembly 35 and the riding assembly 16 are free to rotate about a substantially vertical axis relative to the tow bar 28, more specifically, the axis defined by the pivot pin 78. Thus, as the mower 20 begins to turn, the riding assembly pivots about the pivot pin 78, thereby allowing the mower 20 to turn without carrying the weight of the operator through the turn.

It is understood that, in light of a reading of the foregoing description and drawings, those with ordinary skill in the art will be able to make changes and modifications to the present invention without departing from the spirit or scope of the invention, as defined in the following appended claims.

What is claimed is:

1. A combination of a power driven lawn mower and a riding attachment connected to the lawn mower for carrying a rider standing on a platform in which said riding attachment comprises:

a bracket assembly secured to the mower;

a tow bar assembly pivotally connected to said bracket assembly pivoting about a first axis essentially parallel to a mower plane and essentially transverse to the direction of movement of said mower, said tow bar assembly constrained against pivoting with respect to the mower about an axis essentially vertical;

a pivot assembly pivotally connected to said tow bar assembly at a distal end thereof about a substantially vertical second axis, and including a pivot limiting element; and a riding assembly, including said platform, pivotally connected to said pivot assembly for pivoting about a third axis essentially parallel to the mower plane and parallel to the direction of movement of said mower;

wherein the pivot limiting element of said pivot assembly limits the pivoting of said riding assembly about said third axis so that said riding assembly may freely pivot about said third axis as the riding attachment moves over uneven terrain but is prevented from rotating past a predetermined maximum displacement angle, thereby protecting said rider from dislodgment.

2. A combination as recited in claim 1 wherein said maximum displacement angle is about 20° from a predetermined zero angle position.

3. A combination as recited in claim 1 wherein said riding assembly further includes a support bar pivotally connected to said pivot assembly about said third axis, said pivot limiting element extending over and spaced from said support bar a distance sufficient to limit maximum pivoting of said support bar with respect to said tow bar to said predetermined maximum displacement angle.

4. A combination as recited in claim 3 wherein said support bar has a rectangular cross section and said pivot limiting element is an L-shaped member with a leg extending out over said support bar.

5. A combination as recited in claim 1 wherein said pivot assembly further includes a first pivot pin extending from said pivot limiting element and adapted to be received by said riding assembly, and a pair of spaced brackets adapted to pivotally secure the pivot assembly to the distal end of said tow bar assembly.

6. A combination as recited in claim 5 wherein said riding assembly further includes a support bar defining an opening for receiving said first pivot pin.

7. A combination as recited in claim 5 in which said tow bar assembly includes a tow bar defining a bore therethrough at the distal end thereof, the brackets of said pivot assembly defining first and second aligned openings, said tow bar being pivotally connected to said pivot assembly by a second pivot pin extending through said first and second aligned openings and the bore defined by said tow bar.

8. A riding attachment for a power mower adapted to allow an operator to stand behind and be pulled by the mower during operation, comprising:

a tow bar having a longitudinal axis;

a bracket assembly adapted to be secured to the mower, said bracket assembly being pivotally connected to a first end of said tow bar about a first axis, said first axis being substantially parallel to a horizontal reference plane and substantially perpendicular to the longitudinal axis defined by said tow bar, a pivot assembly pivotally connected to a second end of said tow bar about a substantially vertical second axis;

a riding assembly pivotally connected to said pivot assembly about a third axis, said third axis being axially aligned with the longitudinal axis defined said tow bar and substantially parallel to said horizontal reference plane; and a pivot limiting element integral with and extending from said pivot assembly limiting the pivoting of said riding assembly about said third axis so that said riding assembly may freely pivot about said third axis as the riding attachment moves over uneven terrain but is prevented from rotating past a predetermined maximum displacement angle, thereby protecting said operator from dislodgment.

9. A riding attachment as recited in claim 8 wherein said maximum displacement angle is about 20° from a predetermined zero angle position.

10. A riding attachment as recited in claim 8 wherein said pivot limiting element abuts said riding assembly when said riding assembly rotates to a displacement angle of about 20° thereby preventing further rotation of said riding assembly.

11. A riding attachment as recited in claim 8 wherein said pivot assembly includes a first pivot pin extending from said pivot assembly and adapted to be received by said riding assembly, and a pair of spaced brackets adapted to pivotally secure the pivot assembly to the second end of said tow bar.

12. A riding attachment as recited in claim 11 wherein said riding assembly further includes a support bar defining an opening for receiving said first pivot pin.

13. A riding attachment as recited in claim 11 wherein said tow bar defines a bore therethrough near said second end, the brackets of said pivot assembly defining first and second aligned openings, said tow bar being pivotally connected to said pivot assembly by a second pivot pin extending through said first and second aligned openings and the bore defined by said tow bar.

14. A carriage adapted to be secured to a powered lawn mower for carrying an operator in a standing position comprising:

a platform on which said operator may stand;

a plurality of wheels rotatably coupled to said platform;

a tow bar adapted to be attached to said powered lawn mower at a first end;

a pivot assembly pivotally secured about a substantially vertical axis to said tow bar at a second end thereof, said pivot assembly including a pivot pin, said platform being operatively coupled to said pivot assembly and pivoting about said pivot pin; and a pivot limiting element limiting pivoting of said platform about said pivot pin to a predetermined limit angle thereby minimizing the risk of said carriage overturning and the risk that said operator will be dislodged when said tow bar is attached to said mower for operation thereof.

15. A carriage as recited in claim 14 including an essentially vertical front wall secured to a front edge of said platform and a pair of essentially vertical side walls secured to said platform and said front wall.

16. A carriage as recited in claim 14 including an essentially vertical front wall and a support bar, said platform being secured to the bottom of said front wall and said front wall being secured to an underneath surface of said support bar, said pivot limiting element abutting said support bar when said platform is pivoted to said predetermined limit angle and preventing further pivoting of said platform.

17. A carriage as recited in claim 15 wherein said support bar has a rectangular cross-section, said support bar defining a bore for receiving said pivot pin, said pivot limiting element being an L-shaped member with a leg projecting out over said support bar adjacent said pivot pin for abutting said support bar when said platform is pivoted to said predetermined limit angle.

18. A carriage as recited in claim 15 wherein said pivot assembly further includes a pair of spaced brackets adapted to pivotally secure the pivot assembly to the second end of said tow bar.

19. A carriage as recited in claim 16 wherein said tow bar defines a bore therethrough, the brackets of said pivot assembly defining first and second aligned openings, said tow bar being pivotally connected to said pivot assembly by a second pivot pin extending through said first and second aligned openings and the bore defined by said tow bar.

\* \* \* \* \*